United States Patent
Emerson et al.

(10) Patent No.: US 9,273,816 B2
(45) Date of Patent: Mar. 1, 2016

(54) COMPRESSIBLE DEVICE FOR FREEZE MITIGATION

(71) Applicant: Verizon Patent and Licensing Inc., Arlington, VA (US)

(72) Inventors: Rodney A. Emerson, Allen, TX (US); Michael C. Bradshaw, Bartlett, IL (US); Daniel L. Peterson, Sachse, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 14/302,758

(22) Filed: Jun. 12, 2014

(65) Prior Publication Data
US 2015/0362118 A1 Dec. 17, 2015

(51) Int. Cl.
*E03B 7/10* (2006.01)
*F16L 57/00* (2006.01)

(52) U.S. Cl.
CPC ..................... *F16L 57/00* (2013.01)

(58) Field of Classification Search
CPC .......... E03B 7/10; F16L 51/00; G02B 6/4496
USPC .................. 138/27, 28, 32; 137/301; 220/721
See application file for complete search history.

(56) References Cited

U.S. PATENT DOCUMENTS

| | | | | |
|---|---|---|---|---|
| 2,029,630 | A | * | 2/1936 | McMichael ..................... 138/28 |
| 2,599,325 | A | * | 6/1952 | Fritzberg ........................ 138/28 |
| 3,143,861 | A | * | 8/1964 | Baptiste ........................ 405/159 |
| 4,321,908 | A | * | 3/1982 | Reed .............................. 126/584 |
| 5,058,627 | A | * | 10/1991 | Brannen ........................ 138/27 |
| 5,339,865 | A | * | 8/1994 | Asghar et al. .................. 138/26 |
| 5,538,043 | A | * | 7/1996 | Salazar .......................... 138/26 |
| 6,009,906 | A | * | 1/2000 | Salazar .......................... 138/28 |
| 6,338,364 | B1 | * | 1/2002 | Mendenhall ................... 138/32 |
| 2005/0249472 | A1 | * | 11/2005 | Diggle et al. ................. 385/128 |

* cited by examiner

*Primary Examiner* — Patrick F Brinson

(57) ABSTRACT

A system includes an enclosure and a compressible device. The enclosure forms a confined space where water can accumulate in ambient conditions that fluctuate between freezing and non-freezing water temperatures. The enclosure can contain a protected item within at least a portion of the confined space. The compressible device is within at least the portion of the confined space and compresses under pressure from an uncompressed state to a compressed state that increases the available volume for water within the confined space. The compressible device compresses from the uncompressed state to the compressed state under a first pressure force created by the expansion of frozen water within the enclosure. The first pressure force is less than a second pressure force capable of damaging the enclosure or the protected item.

20 Claims, 10 Drawing Sheets

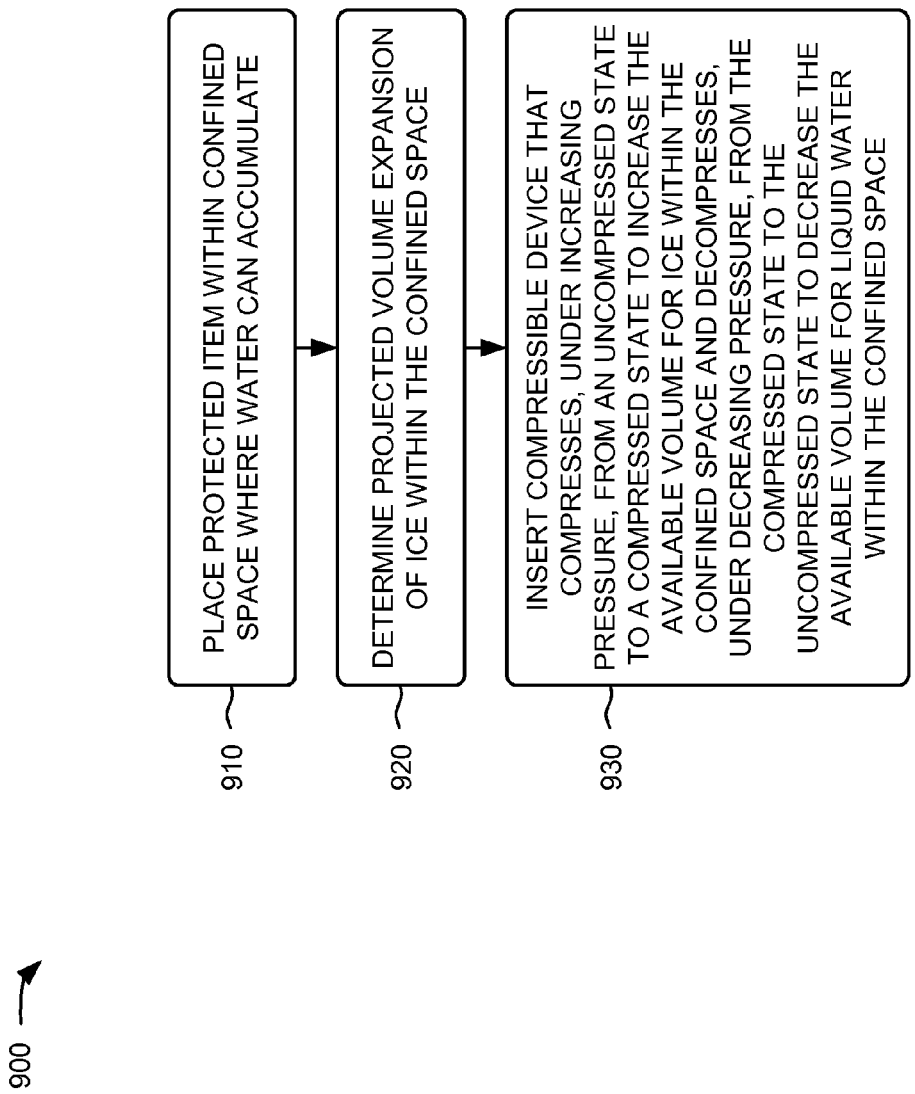

COMPRESSIBLE DEVICE FOR FREEZE MITIGATION

BACKGROUND

Optical fiber cables contain one or more optical fibers that transmit optical signals that are used for providing telecommunication services to business and residential locations. Cables provide protection from the environment and a method to deploy optical fibers in various construction environments. Various cable constructions exist, depending on the type of deployment and/or vintage (direct buried, aerial, conduit, etc).

In some fiber optic transmission systems, lengths of fiber optic cables are installed inside of a conduit that may hold single or multiple cables within a conduit or fiber duct. In long-haul networks, these cables can be run for hundreds of miles in conduit. In metro networks, cables can be run in shorter span-lengths. Regardless of whether deployment is long-haul, metro, or local access networks, cables experience harsh environments, specifically ice in ducts, manholes, etc.

BRIEF DESCRIPTION OF THE DRAWINGS

FIG. 9 is a flow chart of an exemplary process for using a compressible device for freezing water mitigation, according to an implementation described herein.

DETAILED DESCRIPTION OF PREFERRED EMBODIMENTS

The following detailed description refers to the accompanying drawings. The same reference numbers in different drawings may identify the same or similar elements.

Systems and/or methods described herein use a compressible device to mitigate pressure from freezing liquids in partially enclosed spaces, such as a confined area where water can accumulate. More particularly, the compressible device may displace water in a pipe or other structure at temperatures above freezing (e.g., above 0° C.) and be compressed when the water turns into ice to prevent damage to the pipe/structure or items contained within the pipe/structure. Generally, the compressible device is rigid and durable enough to be pulled into a long segment of pipe and may displace water within the pipe. However, the compressible device is also compressible, such that the total volume of the compressible device is decreased when liquid water surrounding the compressible device turns to ice and expands.

According to one implementation described herein, a system may include an enclosure, a protected item, and a compressible device. The enclosure may form a confined space where water can accumulate in ambient conditions that fluctuate between freezing and non-freezing water temperatures. The protected item may be placed within at least a portion of the confined space. The compressible device may be placed within at least a portion of the confined space and may compresses under pressure from an uncompressed state to a compressed state that increases the available volume for water within the confined space. The compressible device may compresses from the uncompressed state to the compressed state under a first pressure force created by the expansion of frozen water within the enclosure. The first pressure force is less than a second pressure force capable of damaging the enclosure or the protected item.

In one implementation, a protected item may include an optical fiber cable that contains one or more optical fibers. Optical fiber has a small core of approximately 8 µm diameter, surrounded by a cladding material. The final diameter of the fiber is approximately 125 microns. In a drawing process, coatings are applied to the glass to reduce bending sensitivities, and bending losses in the final product. Even so, small forces can bend the glass, allowing losses to occur, and can also affects glass lifetimes, especially in older fiber. This attenuation and/or damage to the optical fiber adversely affect network performance. In other implementations, a protected item may include other types of cables or completely different types of objects.

Figure 1:
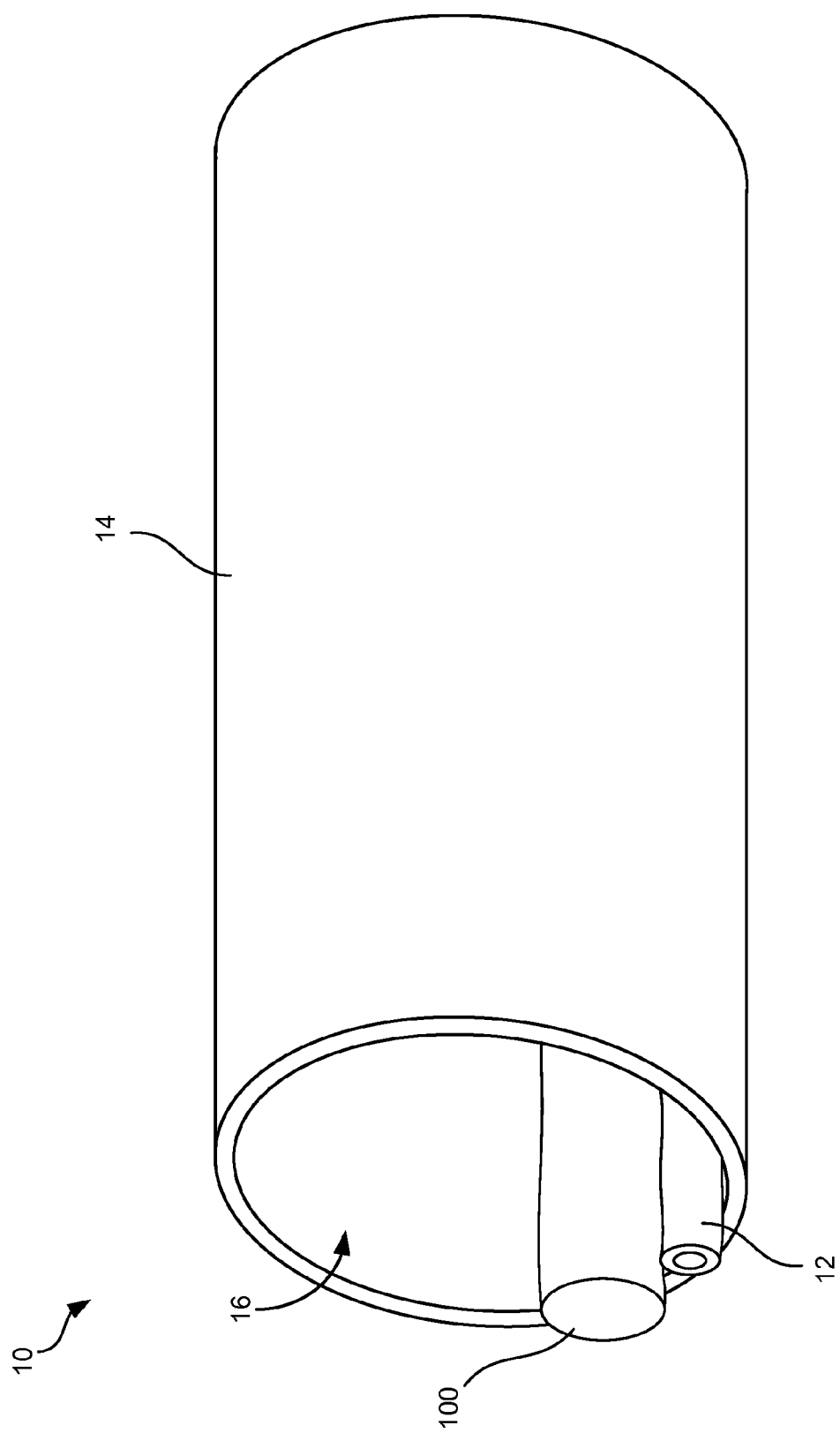
FIG. 1 is a simplified schematic of a portion of an exemplary cable distribution system according to an implementation described herein.

FIG. 1 is a simplified schematic of a portion of an exemplary cable distribution system 10, according to an implementation described herein. As shown in FIG. 1, a protected cable 12, such as a fiber optic cable, may be placed or fed within a pipe 14 or conduit. Generally, pipe 14 may be formed of a relatively rigid material, such as steel, copper, high density polyethylene (HDPE), polyvinyl chloride (PVC), etc. Some or all portions of pipe 14 may be placed in an outdoor or underground environment where water can enter and fill the interior space 16 of pipe 14. While a relatively small portion of pipe 14 is shown in FIG. 1, it should be understood that pipe 14 may extend for many yards or miles.

Water expands when frozen, typically by about nine percent. When in a confined space, such as interior space 16, this expansion can cause pressure and/or damage to protected cable 12, pipe 14, or other items (not shown) within pipe 14. Removal of water from interior space 16 prior to freezing, even if possible, is often not desirable, since the removed water may require treatment or special handling. Use of antifreeze additives for water in interior space 16 may also be undesirable, as they can be expensive, difficult to introduce, damaging to the environment, and/or may provide only temporary efficacy.

According to an implementation described herein, a compressible device 100 (referred to herein generically as "compressible device 100" or particularly as "compressible device 100-x") may be inserted within the interior space 16 of pipe 14. Compressible device 100 may include a polymer material with sufficient tensile strength to support an insertion/pulling process through pipe 14. In one implementation, compressible device 100 may support a cable pull procedure conducted over several hundred yards or more. In another implementation, compressible device 100 may include a non-buoyant material or a combination of materials that does not float in water, so that compressible device 100 will tend to stay submerged proximate to protected cable 12 when interior space 16 is filled with water. In still another implementation, compressible device 100 may include a waterproof material and/or coating to prevent penetration of water into compressible device 100.

Compressible device 100 may displace some of the water that would otherwise enter interior space 16. As water in pipe 14 turns to ice and expands, compressible device 100 can compress to a smaller size under a pressure that is less than the pressure that would cause damage to protected cable 12, pipe 14, or other items within pipe 12. As water in pipe 14 later melts and contracts, compressible device 100 can return to its original shape and volume to again displace water within pipe 14.

Although shown within a relatively short pipe segment in FIG. 1, in other implementations, compressible device 100 may extend through lengthy pipe segments and may be joined to other compressible devices for spanning even longer distances.

Figure 2B:
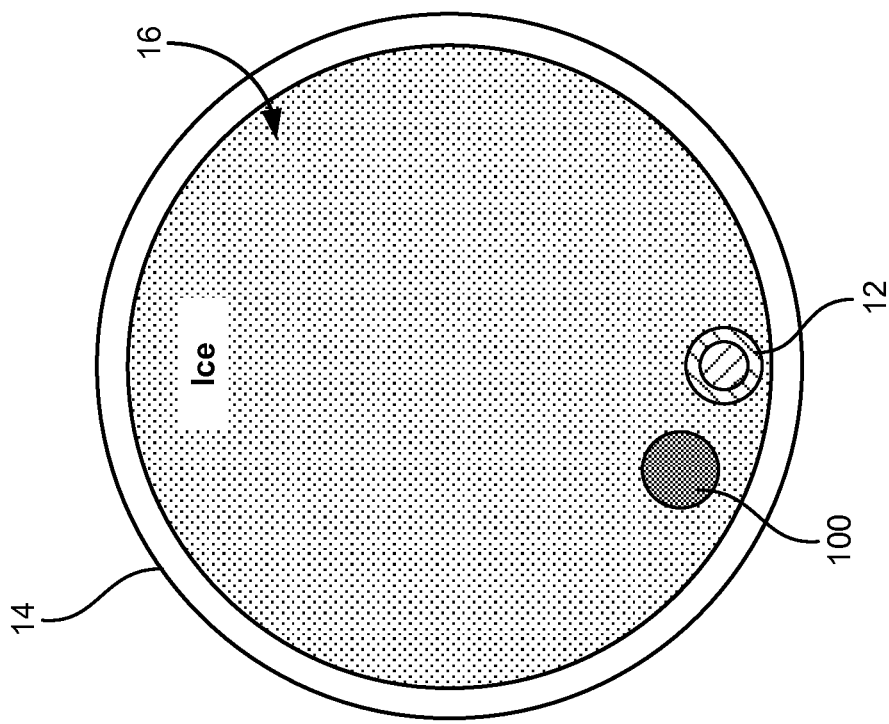
FIGS. 2A and 2B are exemplary cross-sectional views of a portion of the cable distribution system of FIG. 1.
Figure 2A:
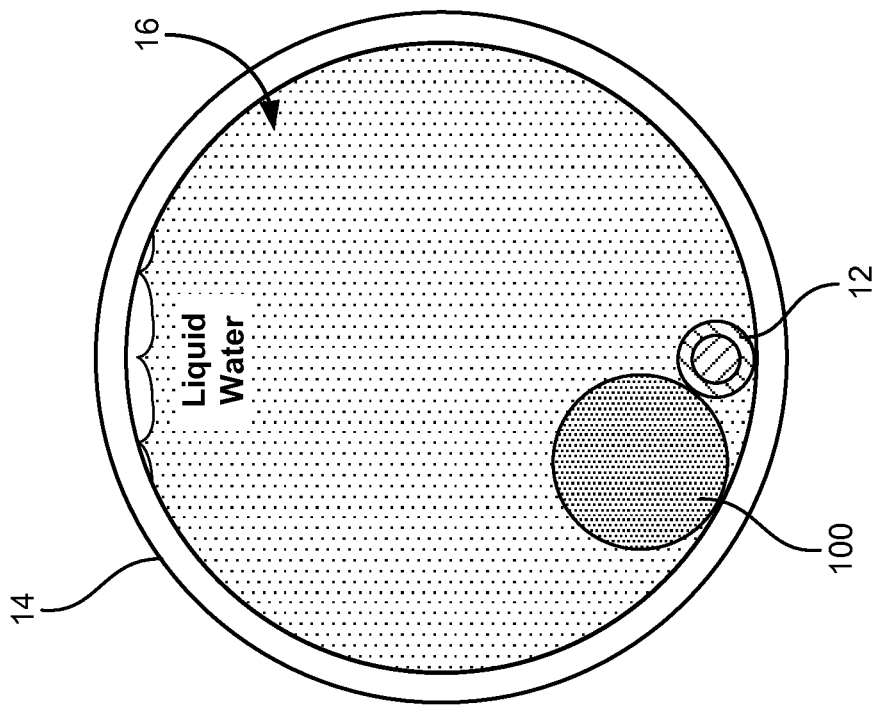

FIG. 2A and FIG. 2B are exemplary cross-sectional views of a portion of the cable distribution system of FIG. 1. FIG. 2A shows the interior 16 of pipe 14 filled with liquid water and compressible device 100 in an uncompressed state. FIG. 2B shows the interior 16 of pipe 14 filled with ice and compressible device 100 in a compressed state.

In one implementation, compressible device 100 may be sized to be large enough such that the difference between the uncompressed volume (FIG. 2A) and compressed volume (FIG. 2B) is at least nine-percent of the total volume of the space (e.g., interior space 16) in the pipe being protected (e.g., pipe 14). In another implementation, compressible device 100 may be sized for a particular installation accounting for the size/number of protected cables 12 or other devices within pipe 14. Thus, the difference between an uncompressed state of compressible device 100 (FIG. 2A) and a compressed state of compressible device 100 (FIG. 2B) may correspond to at least a nine-percent change in the maximum volume of liquid water that can fit in pipe 14 (or a section thereof) after one or more protected cables 12 are inserted.

Figure 3:
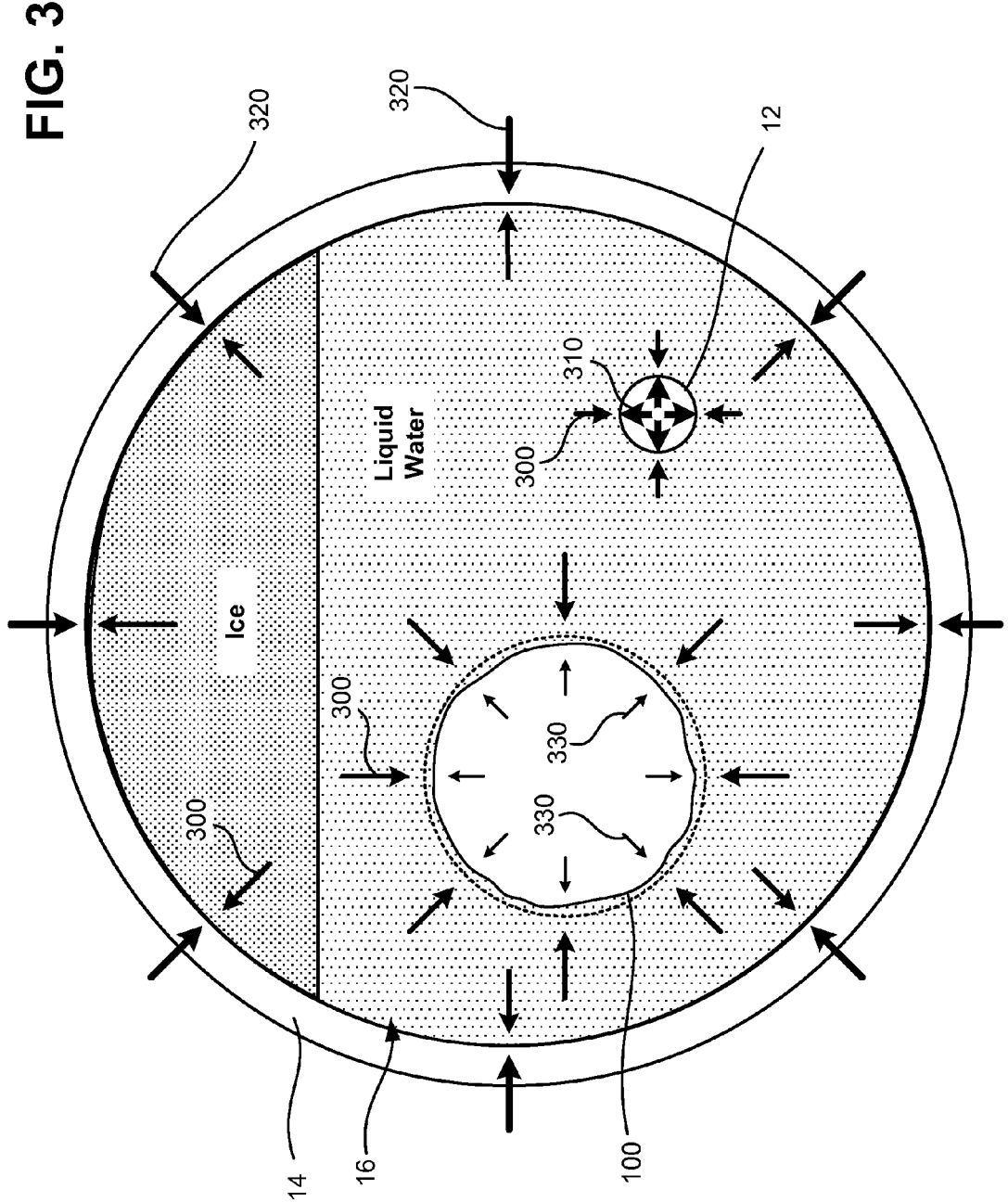
FIG. 3 is a simplified schematic illustrating forces exerted on portions of cable distribution system of FIG. 1 during a transition from liquid water to ice.

FIG. 3 is a simplified schematic illustrating forces exerted on portions of cable distribution system 10 during a transition from liquid water to ice. As shown in FIG. 3, the formation of ice within pipe 14 may cause the total volume of frozen/liquid water to increase and create pressure forces 300 on protected cable 12, pipe 14, and compressible device 100. Protected cable 12 and pipe 14 may have a sufficiently strong structure to counter pressure forces 300 during initial stages of the volume expansion of the frozen/liquid water, as indicated by forces 310 and 320, respectively. Compressible device 100, however, may have a comparatively weaker structure, as indicated by forces 330, such that pressure forces 300 may cause compressible device 100 to begin to collapse and thereby increase the volume available for frozen/liquid water with interior space 16 of pipe 14.

Compressible device 100 may continue to collapse until compressible device 100 is compressed to a point at which forces 330 will exceed forces 300 or the water becomes completely frozen so that the water achieves its maximum volume (e.g., about 109% of the liquid volume). Thus, in some implementations, compressible device 100 may be sized for particular applications (e.g., specific pipe sizes) to compress sufficiently to provide for 109% expansion of liquid water before forces of the frozen/liquid water exceed forces 310 or 320 of protected cable 12 and pipe 14. As described further herein, the smaller of forces 310 and 320 may delineate a maximum pressure force, $P_{max}$, for use in sizing compressible device 100 for particular applications. $P_{max}$ may generally be considered the maximum allowed pressure force, above an ambient pressure, that is needed to change compressible device 100 from an uncompressed state to a compressed state that accommodates the expansion of frozen water within a particular enclosure (such as pipe 14) without damage to the enclosure or protected items within the enclosure.

Figures 4A, 4B:
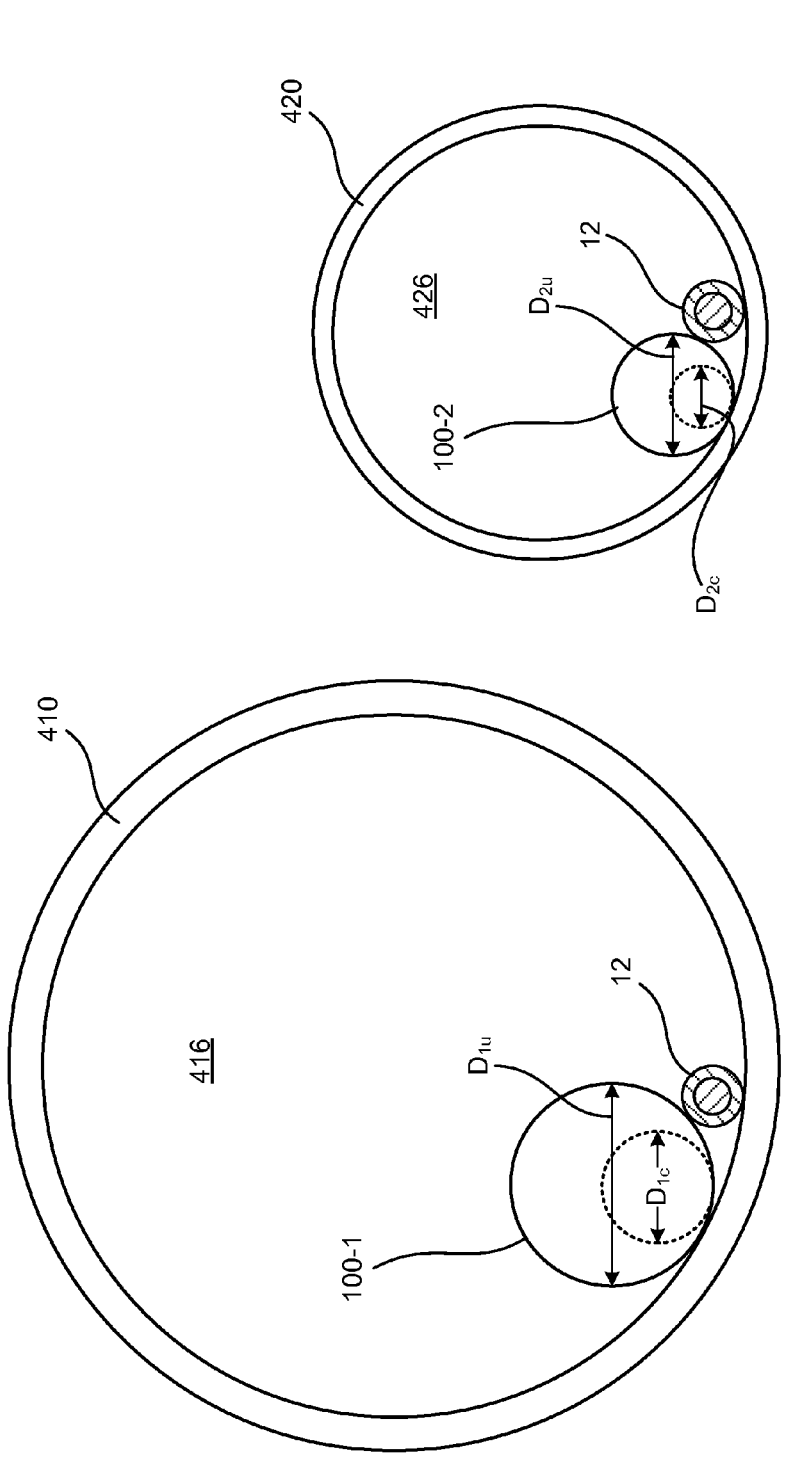
FIGS. 4A and 4B are simplified cross-sectional views of portions of differently-sized cable distribution systems.

FIGS. 4A and 4B are simplified cross-sectional views of portions of differently-sized cable distribution systems. Particularly, FIG. 4A is a simplified cross-sectional view of a six-inch diameter pipe 410, while FIG. 4B is a simplified cross-sectional view of a three-inch diameter pipe 420. In FIG. 4A, a compressible device 100-1 may be sized for a pipe 410 with a six-inch inside diameter interior space 416 that holds protected cable 12. In FIG. 4B, a compressible device 100-2 may be sized for a pipe 420 with a three-inch inside diameter interior space 426 that holds protected cable 12.

Referring to FIG. 4A, assume a consistent diameter along a length of pipe 410, compressible device 100-1, and protected cable 12. Thus, the maximum volume available for water in pipe 410 is proportional to the two-dimensional area of interior space 416 minus the area of compressible device 100-1 and the area of protected cable 12. Further assume that protected cable has diameter of 0.5 inches and that compressible device 100-1 has an uncompressed diameter ($D_{1u}$) of 2 inches. The maximum area of water in the cross-section of interior space 416 would be approximately 25 square inches. To accommodate a nine-percent increase in area, compressible device 100-1 must be compressed by 2.25 square inches at a pressure below that which would damage pipe 410 and/or protected cable 12. The necessary compression could be achieved using materials in compressible device 100 with a compression ratio of 72% at pressure force $P_{max}$ (e.g., to achieve a reduction in area from 3.14 sq. in. to 0.89 sq. in.). Thus, compressible device 100-1 can be configured to achieve (under uniform pressure) a compressed diameter ($D_{1c}$) of about 1.06 inches in the embodiment of FIG. 4A.

Referring to FIG. 4B, assume a consistent diameter along a length of pipe 420, compressible device 100-2, and protected cable 12. Thus, the maximum volume available for water in pipe 420 is proportional to the two-dimensional area of interior space 426 minus the area of compressible device 100-2 and the area of protected cable 12. Further assume that protected cable has diameter of 0.5 inches and that compressible device 100-2 has an uncompressed diameter ($D_{2u}$) of one inch. The maximum area of water in interior space 426 would be approximately 6.08 inches. To accommodate a nine-percent increase in area, compressible device 100-2 must be reduced by 0.55 sq. in. at a pressure below that which would damage pipe 410 and/or protected cable 12. The necessary compression could be achieved using materials in compressible device 100 with a compression ratio of 70% at pressure force $P_{max}$ (e.g., to achieve a reduction in area from 0.79 sq. in. to 0.24 sq. in.) Thus, compressible device 100-2 can be configured to achieve (under uniform pressure) a compressed diameter ($D_{2c}$) of about 0.55 inches.

Although FIGS. 4A and 4B provide particular sizing examples, implementations described herein may apply generally to any form of compressible device 100. Similar sizing determinations may be used for determining dimensions of compressible devices in embodiments described further herein.

Figure 5B:
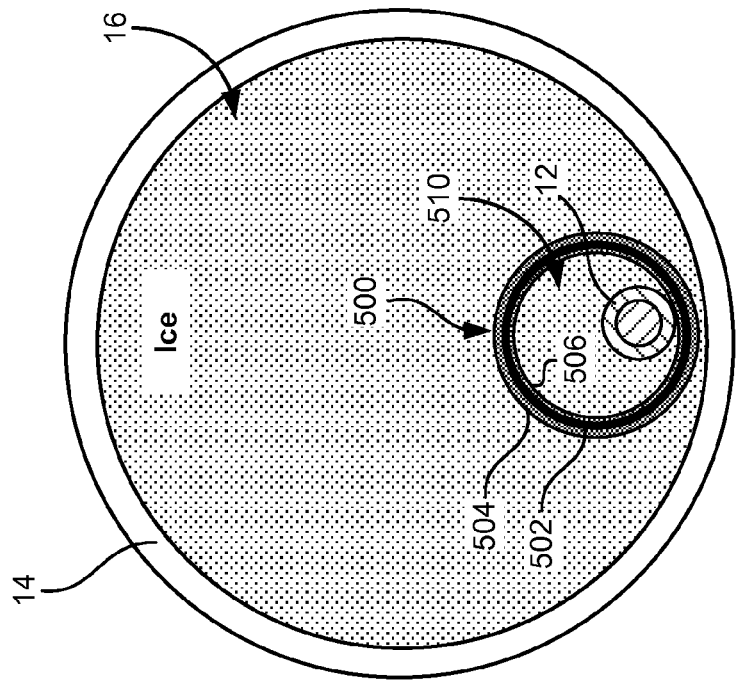
FIGS. 5A and 5B are simplified cross-sectional views of a portion of another exemplary cable distribution system according to an implementation described herein.
Figure 5A:
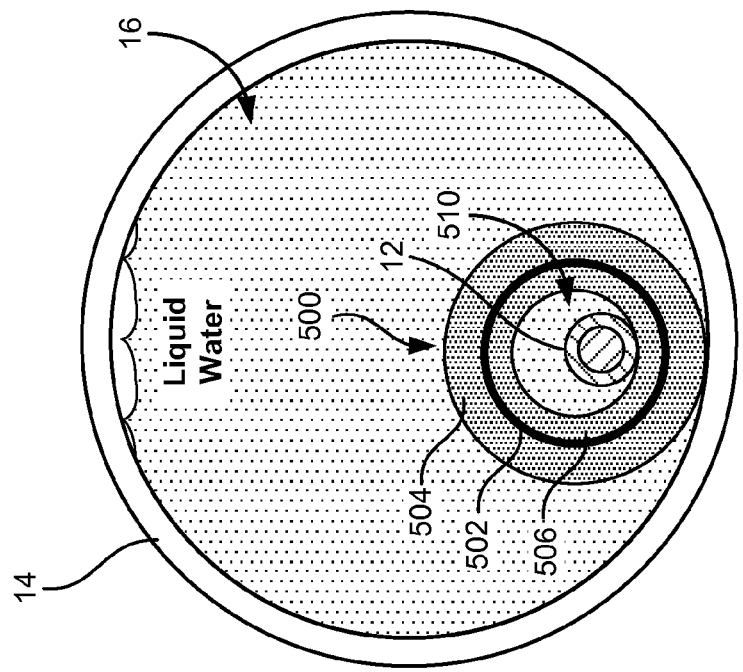

FIGS. 5A and 5B are simplified cross-sectional views of a portion of another exemplary cable distribution system according to an implementation described herein. FIG. 5A shows the interior space 16 of pipe 14 filled with liquid water and a compressible conduit 500 in an uncompressed state.

FIG. 5B shows the interior space 16 of pipe 14 filled with ice and compressible conduit 500 in a compressed state.

According to an implementation described herein, a compressible conduit 500 may be inserted within interior space 16 of pipe 14, and protected cable 12 may be inserted within an interior space 510 of compressible conduit 500. Compressible conduit 500 may include a rigid or semi-rigid interior tube 502 with a compressible outer material 504 and a compressible inner material 506. Compressible outer material 504 may generally surround an outside surface of interior tube 502, and compressible inner material 506 may generally surround an inside surface of interior tube 502. Compressible conduit 500 may generally have sufficient tensile strength to support an insertion/pulling process through pipe 14, such as a cable pull process conducted over several hundred yards or more. Throughout a service life of the cable distribution system, water may enter interior space 16 of pipe 14 and/or interior space 510 of compressible conduit 500. Similar to the material of compressible device 100, compressible outer material 504 and compressible inner material 506 may compress under pressure. As water in pipe 14 turns to ice and expands, compressible outer material 504 and compressible inner material 506 may be compressed to a smaller size under a pressure that is less than the pressure that would cause damage to protected cable 12, pipe 14, or interior tube 502 (e.g., pressure force $P_{max}$). As water in pipe 14 melts and contracts, compressible outer material 504 and compressible inner material 506 can return to their original shape and volume to again displace water within pipe 14.

In one implementation, compressible outer material 504 of compressible conduit 500 may be sized to be large enough such that the difference between the uncompressed volume (FIG. 5A) and compressed volume (FIG. 5B) of compressible outer material 504 is at least nine-percent of the total volume of interior space 16 that is outside compressible conduit 500 (e.g., the volume of interior space 16 minus the volume of compressible conduit 500 and interior space 510). Similarly, compressible inner material 506 of compressible conduit 500 may be sized to be large enough such that the difference between the uncompressed volume (FIG. 5A) and compressed volume (FIG. 5B) of compressible inner material 504 is at least nine-percent of the total volume of interior space 510.

In some implementations, compressible conduit 500 may be sized for a particular installation accounting for the size/number of protected cables 12, other conduits, or other devices within pipe 14. Thus, the difference in volume between an uncompressed state of compressible conduit 500 (FIG. 5A) and a compressed state of compressible conduit 500 (FIG. 5B) may correspond to at least a nine-percent change in the maximum volume of liquid water that can fit in pipe 14 (or a section thereof) after one or more compressible conduits 500 and protected cables 12 are inserted.

Figure 6B:
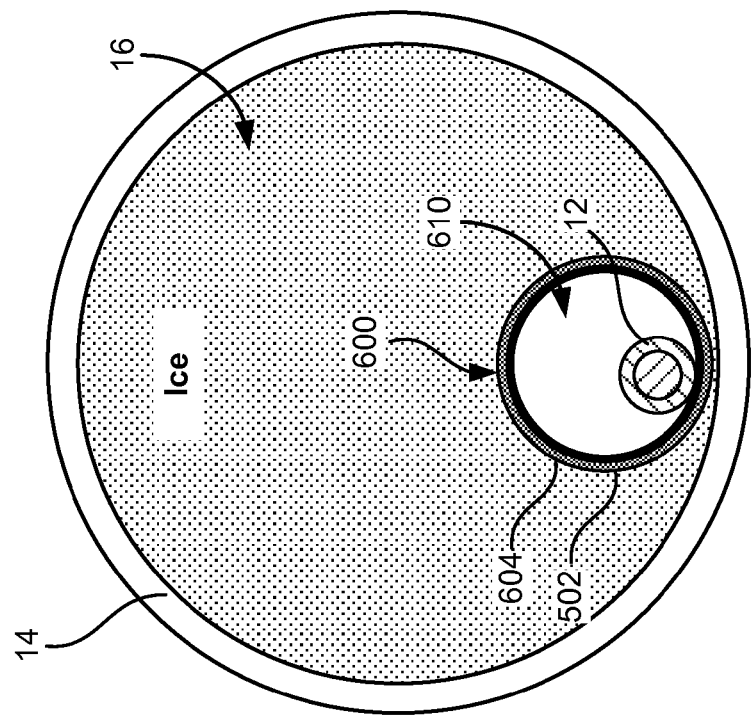
FIGS. 6A and 6B are simplified cross-sectional views of a portion of still another exemplary cable distribution system according to an implementation described herein.
Figure 6A:
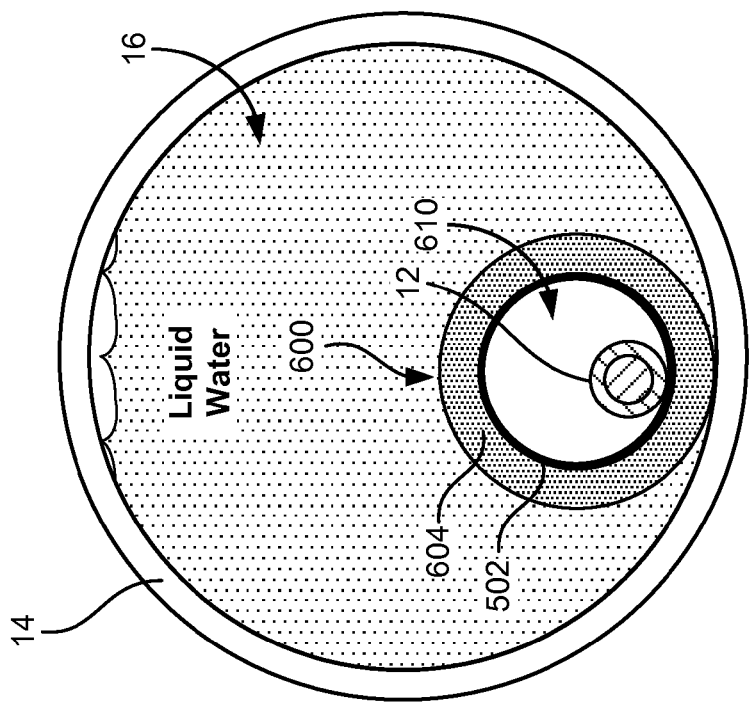

FIGS. 6A and 6B are simplified cross-sectional views of a portion of another exemplary cable distribution system according to an implementation described herein. FIG. 6A shows the interior space 16 of pipe 14 filled with liquid water and a compressible conduit 600 in an uncompressed state. FIG. 6B shows the interior space 16 of pipe 14 filled with ice and compressible conduit 600 in a compressed state.

Similar to compressible conduit 500, compressible conduit 600 may be inserted within interior space 16 of pipe 14, and protected cable 12 may be inserted within an interior space 610 of compressible conduit 600. Compressible conduit 600 may include rigid or semi-rigid interior tube 502 with a compressible outer material 604. Like compressible conduit 500, compressible conduit 600 may generally have sufficient tensile strength to support an insertion/pulling process through pipe 14, such as a cable pull process conducted over several hundred yards or more.

Throughout a service life of the cable distribution system, water may enter interior space 16 of pipe 14, but the interior 610 of compressible conduit 600 may generally be considered to be watertight. In one implementation, compressible outer material 604 of compressible conduit 600 may be sized to be large enough such that the difference between the uncompressed volume (FIG. 6A) and compressed volume (FIG. 6B) of compressible outer material 604 is at least nine-percent of the total volume of interior space 16 that is outside compressible conduit 600 (e.g., the volume of interior space 16 minus the volume of compressible conduit 600 and interior space 610).

As water in pipe 14 turns to ice and expands, compressible outer material 604 may be compressed to a smaller size under a pressure that is less than the pressure that would cause damage to pipe 14 or interior tube 502. Thus, in contrast with compressible conduit 500 above, the pressure force $P_{max}$ for the cable distribution system using compressible conduit 600 may be determined based on the strength of interior tube 502 and pipe 14, without consideration of protected cable 12. As water in pipe 14 melts and contracts, compressible outer material 604 can return to its original shape and volume to again displace water within pipe 14.

Figure 7B:
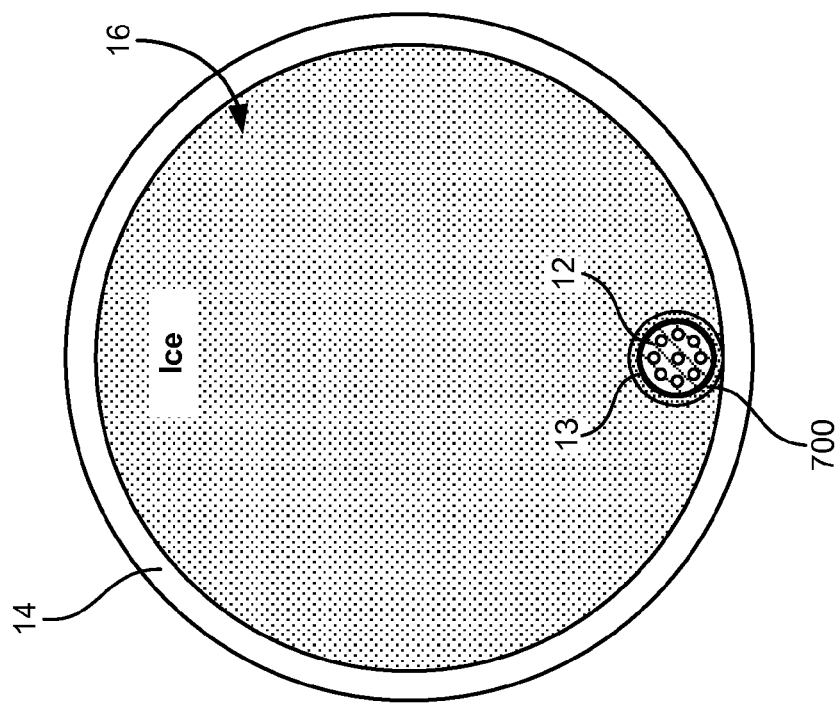
FIGS. 7A and 7B are simplified cross-sectional views of a portion of yet another exemplary cable distribution system according to an implementation described herein.
Figure 7A:
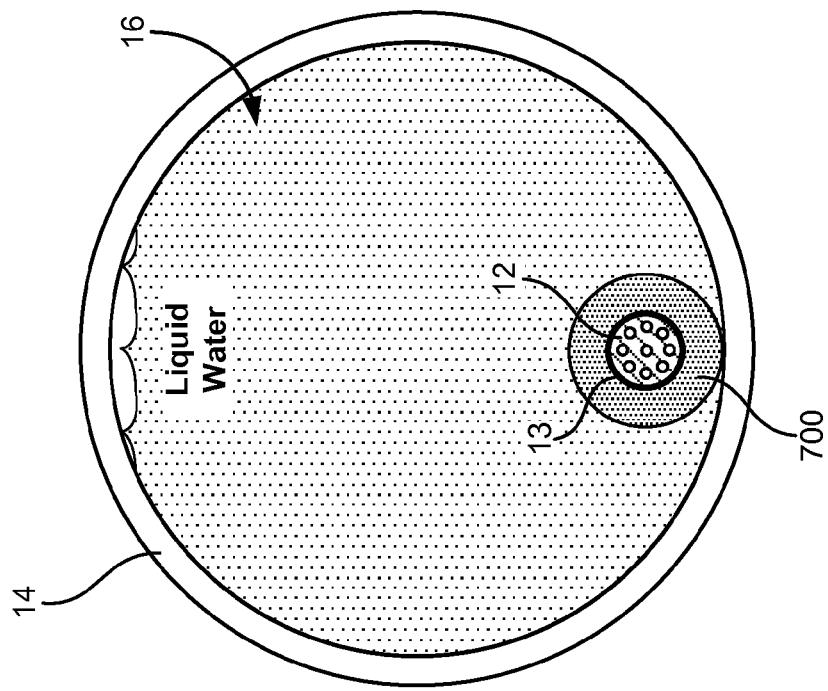

FIGS. 7A and 7B are simplified cross-sectional views of a portion of another exemplary cable distribution system according to an implementation described herein. FIG. 7A shows the interior space 16 of pipe 14 filled with liquid water and protected cable 12 that includes a compressible sheath 700 in an uncompressed state. FIG. 7B shows the interior space 16 of pipe 14 filled with ice and protected cable 12 with compressible sheath 700 in a compressed state.

According to an implementation described herein, protected cable 12 with compressible sheath 700 may be inserted within interior space 16 of pipe 14. Protected cable 12 may include, a cable, such as a fiber optic cable, with or without a central strength member, armored or non-armored. In one implementation, as shown in FIGS. 7A and 7B, compressible sheath 700 may be an integrated outer sheath formed over an inner jacket 13 or a strengthening sleeve of protected cable 12. In another implementation, compressible sheath 700 may be applied over the outer sheath of a conventional cable, such as a multi-fiber optic cable. Installation of protected cable 12 with compressible sheath 700 within pipe 14 can provide a target substance, namely compressible sheath 700, to be crushed, by expansion of liquid water to ice, to prevent excess pressure from being exerted on fiber optic strands within protected cable 12.

Protected cable 12 with compressible sheath 700 may generally have the same tensile strength as conventional fiber optic cables to support an insertion/pulling process through pipe 14, such as a cable pull process conducted over several hundred yards or more. Water may enter interior space 16 of pipe 14 and expand/contract during changes between above-freezing and below-freezing ambient temperatures. Protected cable 12 with compressible sheath 700 may displace some of the water in interior space 16. Similar to the material of compressible device 100, compressible sheath 700 may compress under pressure. As water in pipe 14 turns to ice and expands, compressible sheath 700 may be compressed under a pressure that is less than the pressure that would cause damage to protected cable 12 or pipe 14 (e.g., pressure force $P_{max}$). As water in pipe 14 melts and contracts, compressible sheath 700 can return to its original shape and volume to again displace water within pipe 14.

In one implementation, compressible sheath 700 may be sized to be large enough such that the difference between the uncompressed volume (FIG. 7A) and compressed volume (FIG. 7B) of compressible sheath 700 is at least nine-percent of the total volume of the space (e.g., interior space 16) in pipe 14. In another implementation, compressible sheath 700 may be sized for a particular installation accounting for a particular size/number of protected cables 12 with compressible sheaths 700 or other devices within pipe 14. Thus, the difference between an uncompressed state of compressible sheath 700 (FIG. 7A) and a compressed state of compressible sheath 700 (FIG. 7B) may correspond to at least a nine-percent expansion of the maximum volume of liquid water that can fit in pipe 14 (or a section thereof) after insertion of one or more protected cables 12 with compressible sheaths 700.

Figure 8A:
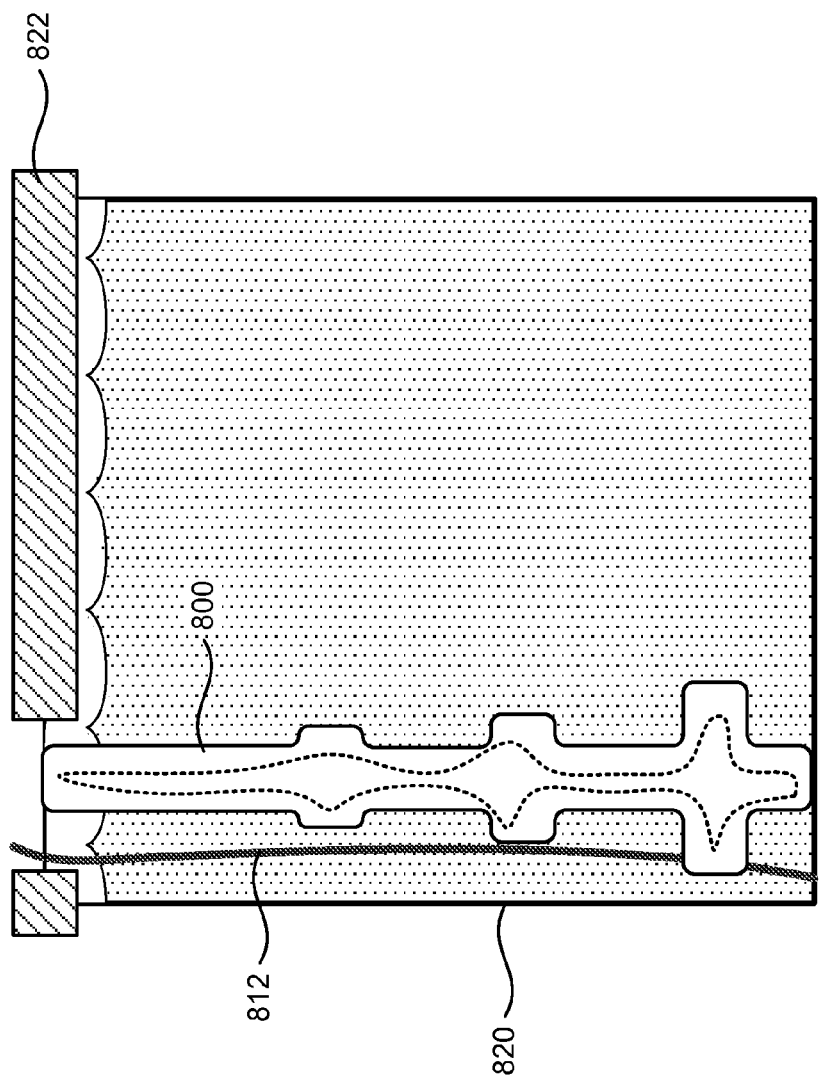
FIGS. 8A and 8B are simplified side cross-section schematics of a compressible membrane included within an enclosure.
Figure 8B:
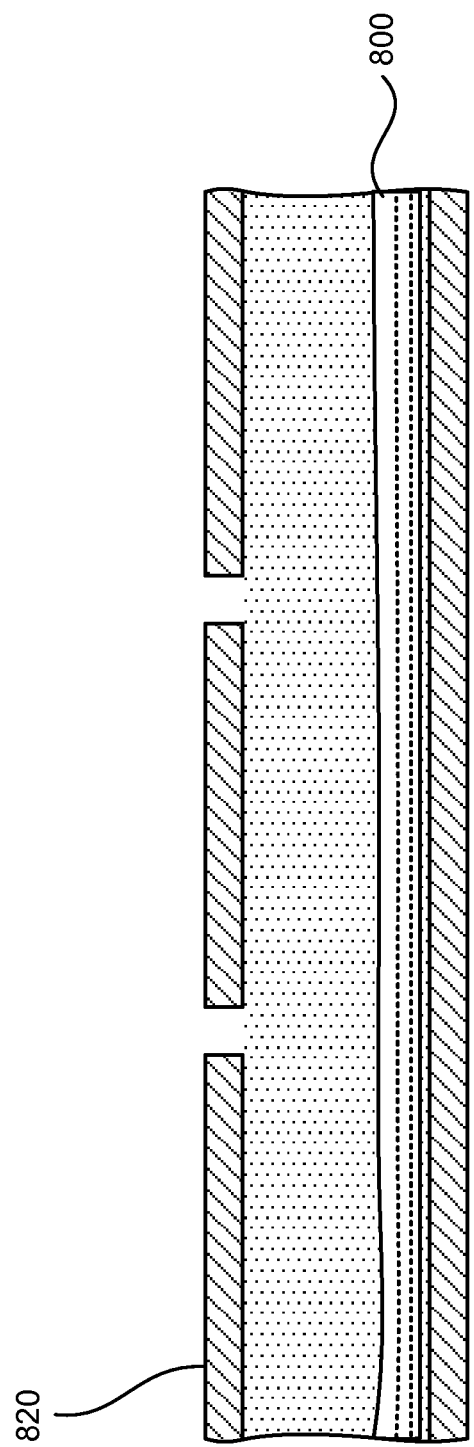

Although described above primarily in the context of a cable distribution system including a cable within a pipe, in other implementations compressible devices may be used for freezing water mitigation in other contexts. For example, FIGS. 8A and 8B are simplified side-cross-section schematics of a compressible membrane 800 included within an enclosure 820. FIG. 8A shows enclosure 820 with a protected item 812 included, while FIG. 8B shows enclosure 820 without a protected item. Referring collectively to FIGS. 8A and 8B, compressible membrane 800 may include a compressible material, similar to that described above in connection with compressible device 100. Compressible membrane 800 may include any shape, including symmetrical or asymmetrical shapes.

As shown in FIG. 8A, protected item 812 may include a cable, a vent, a pipe, or the like, that is at least partially submersed in water within enclosure 820. In one implementation, protected item 812 may include an electrical component (e.g., an electrical cable), a communications component (e.g., a fiber optic cable), or a mechanical component (e.g., an air/fluid tube). In another implementation, shown in FIG. 8B, protected item 812 may not be included within enclosure 820.

Again, referring collectively to FIGS. 8A and 8B, enclosure 820 may include a container that holds water in an environment where ambient conditions can fluctuate between freezing and non-freezing temperatures (e.g., below/above 0° C.). In some implementations, enclosure 820 may include a cover 822 (FIG. 8A). In other implementations, enclosure 820 may have an uncovered opening, multiple openings, or no openings. Enclosure 820 may include, for example, a sewer drain, a pond basin, an outdoor container/tank, an irrigation system, a piping system, etc.

In one implementation, compressible membrane 800 may be positioned near protected item 812, as shown in FIG. 8A. In another implementation, compressible membrane 800 may be attached to or secured around all or a portion of protected item 812. In another implementation, compressible membrane 800 may be positioned along a portion of enclosure 820 so as to no inhibit fluid flow through openings 824 (FIG. 8B). Compressible membrane 800 can be compressed in a manner that increases the available volume for ice within enclosure 820. The size of compressible membrane 800 is generally large enough such that the difference between a fully-compressed and uncompressed volume of compressible membrane 800 is at least enough to accommodate volume expansion of water in enclosure 820 when the water transitions from liquid to ice. In one implementation, compressible membrane 800 may become fully-compressed (e.g., as indicated by dotted lines within FIGS. 8A and 8B) under a pressure force from the expanding ice that is less than a force capable of damaging enclosure 820 or protected item 812.

Although FIGS. 8A and 8B provide simplified views of two configurations for achieving freezing water mitigation, implementations described herein may apply generally to any type of enclosed space with accumulations of water where protection of the boundaries of the enclosed space (e.g., a container or pipe) or items within the enclosed space is desirable. More particularly, compressible membrane 800 may provide freezing water mitigation in instances where antifreeze treatments or removal of water from the enclosed space are not desirable or practical.

FIG. 9 is a flow chart of an exemplary process for using a compressible device for freezing water mitigation, according to an implementation described herein. Process 900 may include placing a protected item within a confined space where water can accumulate (block 910). For example, a protected cable 12 or protected item 812 may be included within an enclosed space, such as pipe 14 or enclosure 820. In other implementations, the enclosed space may itself be the protected item. That is, a container or pipe, for example, may serve as both the water enclosure and the item to protect from the expansion of freezing water.

Process 900 may also include determining a projected volume expansion of ice within the confined space (block 920). For example, as described above in connection with FIGS. 3-4B, compressible device 100 may be sized for particular applications, such a different pipe diameters. In one implementation, compressible device 100 may be sized to compress sufficiently to provide for expansion of water in an enclosed space before pressure forces of the frozen/liquid water exceed the strength of the enclosure or protected devices (e.g., $P_{max}$).

Process 900 may further include inserting, into the confined space, a compressible device that compresses, under increasing pressure, from an uncompressed state to a compressed state that increases the available volume for ice within the confined space and decompresses, under decreasing pressure, from the compressed state to the uncompressed state to decrease the available volume for liquid water within the confined space (block 930). For example, compressible device 100 or compressible membrane 800 may be inserted within pipe 14 or enclosure 820. For example, compressible device 100 may be inserted into a pipe using a cable pull procedure. In another implementation, compressible conduit 500 or compressible conduit 600 may be inserted. In one implementation, each of compressible device 100, compressible conduit 500, compressible conduit 600, or compressible membrane 800 may be sized to displace the volume expansion (e.g., due to freezing) for the maximum amount of water in the enclosed space.

As described above, systems and methods may use a compressible device/membrane as a target subject to be crushed by expansion of ice to prevent excess pressure from being exerted on a container filled with water or a protected item within the container. The compressible device/membrane can be rigid and durable enough to be pulled into a long segment of pipe and displace water within the pipe. However, the compressible device/membrane can be compressible such that the total volume of the exterior membrane is decreased when the water turns into ice.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. For example, while a series of blocks has been described with respect to FIG. 9, the order of the blocks may be modified in other implementations. Further, non-dependent blocks may be performed in parallel.

No element, act, or instruction used in the present application should be construed as critical or essential to the invention unless explicitly described as such. Also, as used herein, the article "a" and "one of" is intended to include one or more items. Further, the phrase "based on" is intended to mean "based, at least in part, on" unless explicitly stated otherwise.

What is claimed is:

1. A system, comprising:
   an enclosure including a confined space where water can accumulate in ambient conditions that fluctuate between freezing and non-freezing water temperatures;
   a protected item within at least a portion of the confined space; and
   a compressible device, separate from the protected item and within at least the portion of the confined space, the compressible device compressing under pressure from an uncompressed state to a compressed state that increases the available volume for water within the confined space,
   wherein the compressible device includes a combination of materials that does not float in water,
   wherein the compressible device compresses from the uncompressed state to the compressed state under a first pressure force created by the expansion of frozen water within the enclosure, and
   wherein the first pressure force is less than a second pressure force capable of damaging one of the enclosure or the protected item.

2. The system of claim 1, wherein the enclosure includes a pipe and the protected item includes a fiber optic cable.

3. The system of claim 1, wherein a difference in volume between the compressible device in the uncompressed state and the compressible device in the compressed state is equal to at least nine percent of a volume of the enclosure.

4. The system of claim 1, wherein a difference in volume between the compressible device in the uncompressed state and the compressible device in the compressed state is at least equal to nine percent of the available volume for water within the enclosure when the enclosure includes the protected item and the compressible device in the uncompressed state.

5. The system of claim 1, wherein the compressible device includes a solid tubular shape.

6. The system of claim 1, wherein the protected item includes a fiber optic cable and wherein the compressible device includes a sheath around at least a portion of the fiber optic cable.

7. The system of claim 1, wherein the compressible device includes a conduit tube with a compressible outer material around an outside surface of the conduit tube.

8. The system of claim 7, wherein the compressible device further includes a compressible inner material around an inside surface of the conduit tube, and wherein the compressible device forms an interior space that includes the protected item and water.

9. The system of claim 1, wherein the compressible device de-compresses from the compressed state to the uncompressed state when the first pressure force is reduced to an ambient pressure for liquid water within the enclosure.

10. The system of claim 1, wherein the compressible device includes a tensile strength sufficient to withstand a cable pull procedure, through the enclosure, of hundreds of yards.

11. A device, comprising:
    a compressible membrane for insertion into an enclosure where water can accumulate in ambient conditions that fluctuate between freezing and non-freezing water temperatures, the enclosure including a protected item and the device including a combination of materials that does not float in water,
    wherein the compressible membrane compresses, under pressure, from an uncompressed state to a compressed state that increases the available volume for water within the confined space,
    wherein the compressible membrane compresses from the uncompressed state to the compressed state under a first pressure force that is created by the expansion of frozen water within the enclosure,
    wherein the first pressure force is less than a second pressure force capable of damaging the protected item, and
    wherein the device is inserted into the enclosure separately from the protected item.

12. The device of claim 11, wherein the enclosure comprises a pipe,
    and
    wherein the first pressure force is less than a force capable of damaging the enclosure.

13. The device of claim 11, wherein a difference in volume between the compressible membrane in the uncompressed state and the compressible membrane in the compressed state is at least equal to nine percent of the available volume for water within the enclosure when the enclosure includes the protected item and the compressible membrane in the uncompressed state.

14. The device of claim 13, further comprising:
    wherein the compressible membrane includes a waterproof coating.

15. The device of claim 11, wherein a difference in volume between the compressible membrane in the uncompressed state and the compressible membrane in the compressed state is equal to at least nine percent of a volume of the enclosure.

16. The device of claim 11, wherein a first portion of the compressible membrane is secured to an outside surface of a conduit tube that is separate from the protected item,
    wherein a second portion of the compressible membrane is secured to an inside surface of the conduit tube, and
    wherein the device is installed so that the protected item is within an interior space of the conduit tube.

17. The device of claim 11, wherein the compressible membrane is secured to a fiber optic cable.

18. A method, comprising:
    placing a protected item within a confined space where water accumulates;
    determining a maximum projected volume expansion of liquid water to ice within the confined space; and
    inserting, into the confined space and after the placing, a compressible device that compresses, under increasing pressure, from an uncompressed state to a compressed state that increases the available volume for ice within the confined space and decompresses, under decreasing pressure, from the compressed state to the uncompressed state to decrease the available volume for liquid water within the confined space, wherein the compressible device includes a combination of materials that does not float in water.

19. The method of claim 18, wherein inserting the compressible device includes:
    pulling the compressible device though a pipe segment.

20. The method of claim 18, wherein determining the maximum projected volume expansion of liquid water includes one of:

determining an increase in volume, from liquid water to ice, for an amount of water that is equivalent to the volume of the enclosure; or determining an increase in volume, from liquid water to ice, for an amount of water that is equivalent to the volume of the enclosure minus the volume of the compressible device in the uncompressed state.

\* \* \* \* \*